United States Patent Office 3,141,537
Patented July 21, 1964

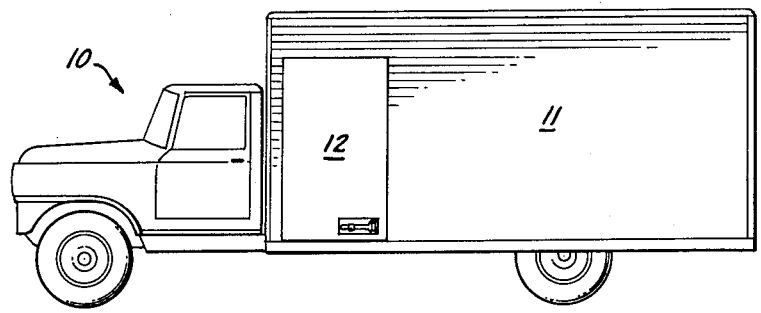
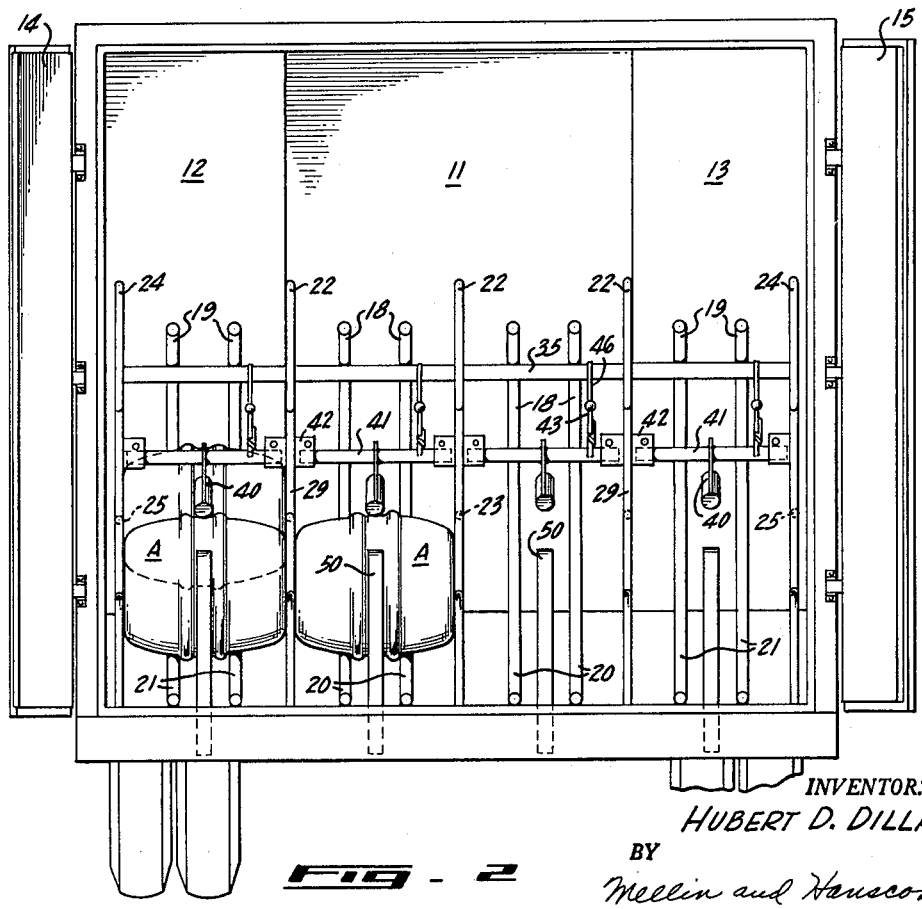

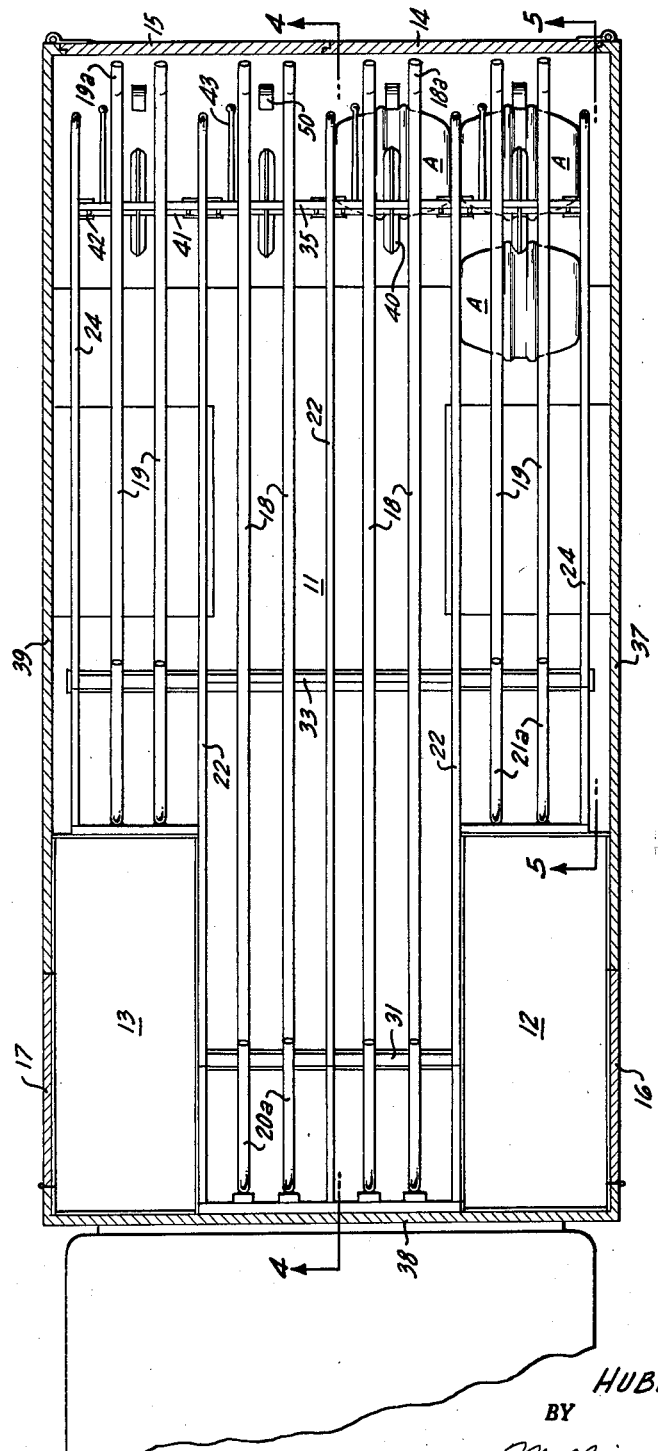

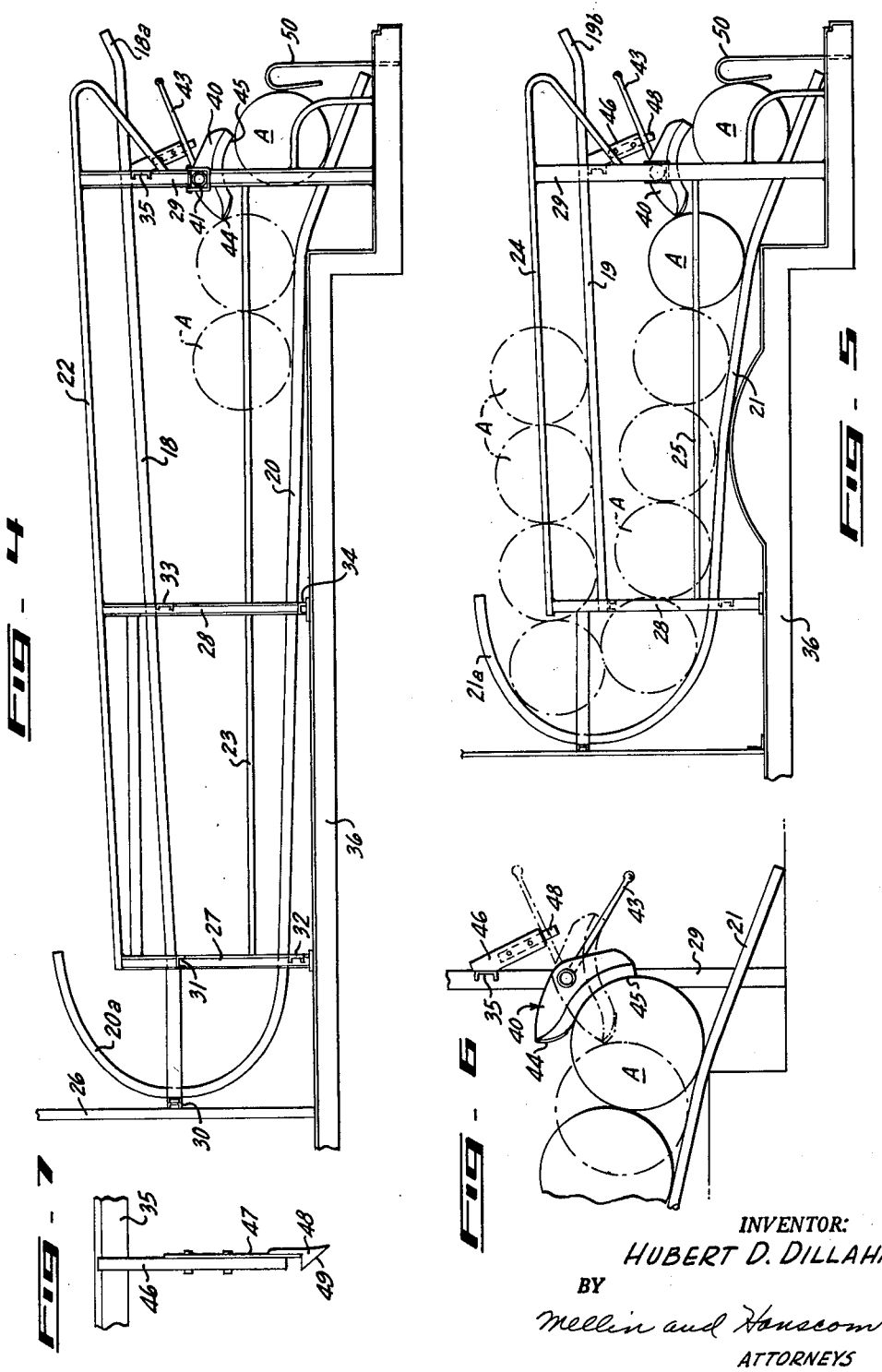

3,141,537
DELIVERY VEHICLE FOR KEG-CONTAINED PRODUCTS
Hubert D. Dillaha, 1901 Oak View Drive, Oakland 2, Calif.
Filed Aug. 24, 1962, Ser. No. 219,259
2 Claims. (Cl. 193—27)

This invention relates to delivery vehicles, and more particularly to vehicles for transporting and delivering keg-contained products.

Kegged products such as beer have been extremely difficult to load, store and unload from conventional delivery vehicles, especially when deliveries are being made at many different locations and when empty containers must also be picked up and stored on the vehicle. Conventional beer delivery vehicles normally have a large storage compartment with a relatively flat bed upon which the kegs are usually stood on end. This storage arrangement necessitates that a deliveryman climb into the storage compartment for each keg to be unloaded, and periodically he must sort and rearrange the kegs, placing the empties in the more remote regions and bringing the filled containers nearer to the access of the storage compartment. It will be evident, therefore, that a great deal of time and much manual effort is needed each time a keg-contained product is unloaded from a conventional delivery vehicle. The labor involved is greatly magnified by the nature of such products, which in weight often exceed 150 pounds.

In brief, the present invention contemplates a delivery vehicle having a storage compartment accessible from the rear end thereof and including a plurality of upper and lower supporting rails extending longitudinally of the vehicle. It will be evident that filled kegs as well as empties may be loaded and removed from the rear end of the vehicle without requiring the deliveryman to enter the storage compartment even one time. One virtue of the structure contemplated is the inherent safety of an apparatus that provides both end-loading and end-unloading. Moreover, since the structural arrangement and combination permits a loading and unloading of relatively large and elongate storage compartments entirely from one end thereof, there is little difficulty in insulating such compartments by providing a single access at the one end.

Accordingly, one object of this invention is to provide a new and useful delivery vehicle for keg-contained products, allowing said products to be loaded and unloaded with a minimum of effort.

Another object of the invention is to provide a delivery vehicle of the kind described having a storage compartment accessible only from the rear end thereof, thereby providing maximum safety for the deliveryman and retaining maximum refrigeration conditions which prevail within the storage compartment.

A further object of the invention is to provide a delivery vehicle for keg-contained products having a storage compartment accessible from the rear end thereof and including apparatus comprising a plurality of upper supporting rails, each rail extending forwardly and longitudinally of the vehicle from a loading point adjacent the rear end thereof, at least a portion of said upper supporting rails being inclined downwardly relative to said loading point to induce rolling movement of keg-contained products, a plurality of lower supporting rails disposed beneath the upper supporting rails, each rail extending rearwardly and longitudinally of the vehicle from a receiving point forwardly of upper supporting rails and terminating at a delivery point adjacent the rear end of the vehicle and subjacent the loading point of upper supporting rails, at least a portion of said lower supporting rails being inclined downwardly relative to its receiving point to induce rolling movement of keg-contained products, and releasable means for engaging kegs while they are supported upon lower supporting rails at dispensing stations.

A further object is to provide a delivery vehicle of the kind described including a manually controlled lever for dispensing one keg at a time from the storage compartment of the vehicle and permitting a control of the dispensed keg to a delivery point convenient for manual handling.

Another object of the invention is to provide a delivery vehicle of the kind described having upper and lower supporting rails and further including guide rails disposed laterally and above said upper and lower supporting rails, respectively, said guide rails retaining the keg containers upon certain supporting rails and providing parallel pathways extending longitudinally of the vehicle.

Other objects of this invention will become apparent in view of the following description and the accompanying drawings.

In the drawings forming a part of this application and in which like parts are identified by like reference numerals throughout the same, FIG. 1 is a side elevation of a beer delivery truck having a storage compartment arranged and provided with apparatus in a preferred manner contemplated by this invention;

FIG. 2 is an end elevation of the delivery vehicle shown in FIG. 1 and having the doors opened to show the interior apparatus in the storage compartment;

FIG. 3 is a plan view of the storage compartment for the vehicle with the top removed;

FIG. 4 is a side elevation of a center set of upper and lower supporting rails including their mounting construction as viewed on lines 4—4 of FIG. 3;

FIG. 5 is a side elevation of upper and lower supporting rails including their mounting construction as viewed on lines 5—5 of FIG. 3;

FIG. 6 is an enlarged side elevation of the manually operable release mechanism shown in FIGS. 4 and 5 and including illustrated positions of alternative movement; and FIG. 7 is a plan view of a detent assembly for engaging the manual operating handle of the release mechanism.

Referring to FIG. 1, there is shown a delivery vehicle generally indicated by reference numeral 10, having a storage compartment 11 especially designed for handling and dispensing keg beer. A portion of the vehicle is reserved for the storage of bottled beer, and for this purpose side storage compartments 12 and 13 are provided as shown in FIGS. 2 and 3. It will be evident in view of the following description that the combination of apparatus shown is of particular utility in connection with the vehicle's storage space since it enables that space to be subdivided into a major compartment for handling keg beer and minor-sized compartments for handling bottled beer. Moreover, the arrangement of the apparatus within the storage compartment 11 of vehicle 10 is of considerable importance since the keg beer is both loaded and dispensed from the end of the vehicle.

Referring to FIG. 2, access may be had to compartment 11 through a pair of hinged doors 14 and 15. A separate access is provided for compartments 12 and 13 from their respective doors 16 and 17 located on opposite sides of the vehicle. Moreover, it should be understood that storage compartments for keg beer are normally insulated and in some instances refrigerated, since unnecessary exposure of the storage compartment for keg beer is to be avoided to prevent damage to the unpasteurized keg beer. Therefore, the arrangement of providing separate access to compartment 11 and side compartments 12 and 13 is of importance, since it permits the removal of bottled beer from the side compartments without opening compartment 11.

Referring to FIGS. 2 and 3, the interior of compartment 11 contains a plurality of upper support rails 18 and 19 disposed in pairs, each rail extending forwardly and longitudinally of said vehicle from a loading point adjacent the rear end thereof. Rails 18 extend the full length of compartment 11, including a space between compartments 12 and 13. Rails 19 are of shorter length than rails 18 and terminate rearwardly of compartments 12 and 13.

Referring to FIGS. 4 and 5, it will be noted that the upper supporting rails are inclined downwardly from loading points adjacent the rear of the vehicle for the purpose, of course, of inducing rolling movement of keg-contained products.

A plurality of lower supporting rails 20 and 21 are respectively disposed beneath upper supporting rails 18 and 19, each of said lower supporting rails extending rearwardly and longitudinally of the vehicle from receiving points forwardly of said upper supporting rails and terminating at delivery points adjacent the rear end of the vehicle and subjacent to the loading points of their respective upper supporting rails. Similarly to rails 18 and 19, lower supporting rails 20 and 21 are inclined downwardly to induce rolling movement of keg-contained products from their receiving points to the delivery points adjacent the rear end of the vehicle.

In addition to rails 18–21, a plurality of guide rails 22, 23, 24 and 25 are provided for retaining the keg containers A upon their respective supporting rails, and further providing parallel pathways extending longitudinally of the vehicle.

Rails 18–25 are mounted upon a supporting framework comprising vertical channel members 26, 27, 28 and 29 and horizontally disposed channel members 30, 31, 32, 33, 34 and 35. The supporting framework may be secured to the bed 36 and sides of the truck 37, 38 and 39, by means of bolts or by welding. The supporting and guide rails are preferably mounted to the supporting framework by welding, so as to make a more rigid structure.

Referring to FIGS. 4 and 5, it will be noted that the loading ends of rails 18 and 19 terminate with inclined ends 18a and 19a, respectively, said ends preventing inadvertent rearward rolling of kegs such as might occur when the vehicle is quickly accelerated. The forward or leading ends of the lower supporting rails 20 and 21 include arcuate portions 20a and 21a, respectively. It will be evident that these arcuate portions extend upward and terminate at points above their respective upper supporting rails so as to direct and receive the kegs A as they move from upper supporting rails to their lower supporting rails in a manner best shown in FIG. 5.

In view of the drawings and the above description, it will be evident that kegs A may be loaded upon the upper supporting rails 18 and 19 from an end access to the storage compartment 11. Loaded kegs of beer, which may weigh in the neighborhood of 150 pounds, may be easily placed upon the upper supporting rails by the use of a conventional lift truck. An alternative solution, of course, would be to provide a warehouse loading platform at the level of the upper supporting rails. In any event, loaded kegs of considerable weight may be easily placed upon the upper supporting rails while the vehicle is at a warehouse by using standard methods of handling and conventional apparatus.

Referring again to FIGS. 4, 5, and particularly to FIG. 6, means is provided for sequentially engaging and dispensing kegs at dispensing positions upon respective lower supporting rails. For this purpose, a dog member 40 is suitably mounted upon a horizontal axis above each set of lower supporting rails. Each dog is secured to a shaft 41 supported between spaced collars 42 mounted to the vertical upright channels 29. A manual operating handle 43 is secured to each shaft 41 for pivotally rotating the shaft and the respective dog member 40 secured thereon.

Dogs 40, it will be seen, are arcuately shaped, and being formed with front and back keg-engaging surfaces 44 and 45, respectively. Referring to FIG. 6, it will be noted that one or the other of the surfaces 44 or 45 is disposed in the pathway of kegs advancing upon respective lower supporting rails when the dog is pivoted between its two positions of operation, as shown by the broken and solid lines of FIG. 6.

A detent assembly comprising a support rod 46 secured to horizontal channels 35, a leaf spring 47, and a lip 48 mounted to the end of said spring, is employed for holding the handles 43 in a position of operation for latching the dogs 40 to prevent an advancement of kegs A along the supporting rails. Contact is made between the end of rod 46 and the handle 43 to limit counterclockwise movement of the handle, as shown in FIGS. 5 and 6, and this contact is made shortly after surface 45 of the dog 40 raises sufficiently to permit passage therebeneath of a keg A. Lip 48 is formed with a camming surface 49 that is initially contacted by the handle 43 under the moving force imposed by a keg moving beneath the dog, and engaged with surface 45 thereof. Accordingly, as kegs in advance of dog 40 are released one at a time through operation of handle 43, surface 44 thereby being raised, the keg first in line, which occupies a dispensing position as indicated by the broken lines of FIG. 6, will move into engagement with surface 45 while rolling rearwardly toward a delivery point. The weight of the dispensed keg will pivot the engaged dog 40 and its handle 43 in a counterclockwise direction until the handle is disposed in back of the lip 48.

In view of the weight of the keg, and the fact that the kegs are manually handled after coming to a delivery point at the end of the truck, a retainer bar 50 may be employed as an insurance measure against inadvertent actuation of the release handle 43. Retainer bars 50 are disposed in the pathway of the lower supporting rails, rearwardly of their dispensing positions and adjacent to a delivery point. Preferably, these bars are made of spring steel to cushion the impact of a keg rolling downwardly from a dispensing position.

In operation, filled kegs A are loaded upon the upper supporting rails 18 and 19 in the manner previously described. The first and successive kegs which are placed upon the upper supporting rails will, of course, roll forwardly relative to the vehicle until they are received on the lower supporting rails and move rearwardly toward a delivery point. The keg first in line is engaged at a dispensing position by surface 44 of the dog 40 which is pre-positioned as shown in FIG. 5. Now, any time a keg is to be taken off the vehicle, the deliveryman need only actuate the handle 43 for moving the dog controlling the movement of kegs from a given line. It is exceedingly important to note that in actuating the handle 43, the operator at all times has control of the moving line of kegs. Although the kegs may be of great weight, the specific location and arrangement of dog 40 prevents runaway release of the dispensed keg as the surface 44 is pivoted into the position shown by the solid lines of FIG. 6. Moreover, it will be seen that an operator of handle 43 has manual control over the rate at which the line of kegs rolls rearwardly, and the dispensed keg itself does not roll free until it is approximately adjacent a delivery point at the end of the vehicle.

The combination of apparatus shown and described is of particular significance since it permits empty kegs to be loaded onto the vehicle in uniform fashion and without co-mingling them with filled kegs. While a filled keg of beer, for example, will weigh in the neighborhood of 155 pounds, the empty kegs returned to the vehicle are less than 10 pounds, and for this reason no deliveryman would have difficulty in placing the empty kegs upon the upper supporting rails. Since empty kegs are usually picked up at about the same rate and simultaneously with the delivery of filled kegs, there is no need for additional storage room for the empty kegs. Of course, in the event that there is an unusual imbalance in the rate at which kegs are picked up compared with kegs delivered, certain of the supporting rails may be used exclusively for storing empty kegs.

The keg-dispensing operation above described requires but one access to the compartment 11, and that being located near the end of the vehicle ensures maximum safety to the driver. Moreover, since the entire contents of compartment 11 can be loaded and unloaded in a minimum of time and without providing side accesses to the compartment, the degree of refrigeration within said compartment may be retained by the insulated side walls of the vehicle.

Since many keg-delivery trucks also deliver a small quantity of bottled beer, it will be evident that the apparatus contemplated herein is uniquely suited to accommodate this requirement. Compartments 12 and 13 afford all the necessary space usually required for storing cases of bottled beer, and since each of these compartments has its own access opening, their contents may be removed without exposing the interior of compartment 11. It should be understood, of course, that bottled beer, unlike keg beer, need not be refrigerated and no harm will be done should it be warmed. This, of course, is not true of the keg-contained product known as draft beer, which is unpasteurized.

In view of the above description, it should be apparent that various changes may be made in the size, shape and arrangement of certain parts without departing from the spirit of this invention or the scope of the attached claims, and each of such changes is contemplated.

Having thus described my invention, what I claim and desire to secure by Letters Patent is:

1. A delivery vehicle for both keg-contained and bottled products comprising: a main storage compartment having a rear access opening and closure doors therefor, side storage compartments arranged on opposite sides and at the forward corners of said main storage compartment, said side compartments having separate and respective side access openings and closure doors therefor, each side compartment being partitioned from the main storage compartment by interior side and end walls, means for advancing keg containers from an inner region of said main storage compartment to a delivery point adjacent the rear end of said vehicle, said means comprising upper supporting rails extending forwardly and longitudinally of said vehicle from a loading point adjacent the rear access opening of said main storage compartment to a point intermediate said side storage compartment and their respective interior side walls, at least a portion of said upper supporting rails being inclined downwardly relative to said loading point to induce rolling movement of keg containers, lower supporting rails disposed beneath said upper supporting rails and extending rearwardly and longitudinally of said vehicle from a receiving point forwardly of upper supporting rails and terminating at a delivery point adjacent the rear access opening of said main storage compartment subjacent the loading point of upper supporting rails, at least a portion of said lower supporting rails being inclined downwardly relative to said receiving point to induce rolling movement of the keg-contained products.

2. The delivery vehicle of claim 1 and further including pairs of upper and lower supporting rails extending longitudinally of said vehicle from the loading point adjacent the rear access opening of said vehicle to points adjacent the interior end walls of respective side compartments, each side compartment having a depth inward from its access opening approximately equal to the lateral dimension of the keg containers being stored.

References Cited in the file of this patent

UNITED STATES PATENTS

| | | |
|---|---|---|
| 1,088,980 | Goble | Mar. 3, 1914 |
| 2,122,322 | Kidwell | June 28, 1938 |
| 2,146,533 | Erickson | Feb. 7, 1939 |
| 2,633,714 | Wehby | Apr. 7, 1953 |
| 3,055,293 | Lariccia | Sept. 25, 1962 |